UNITED STATES PATENT OFFICE.

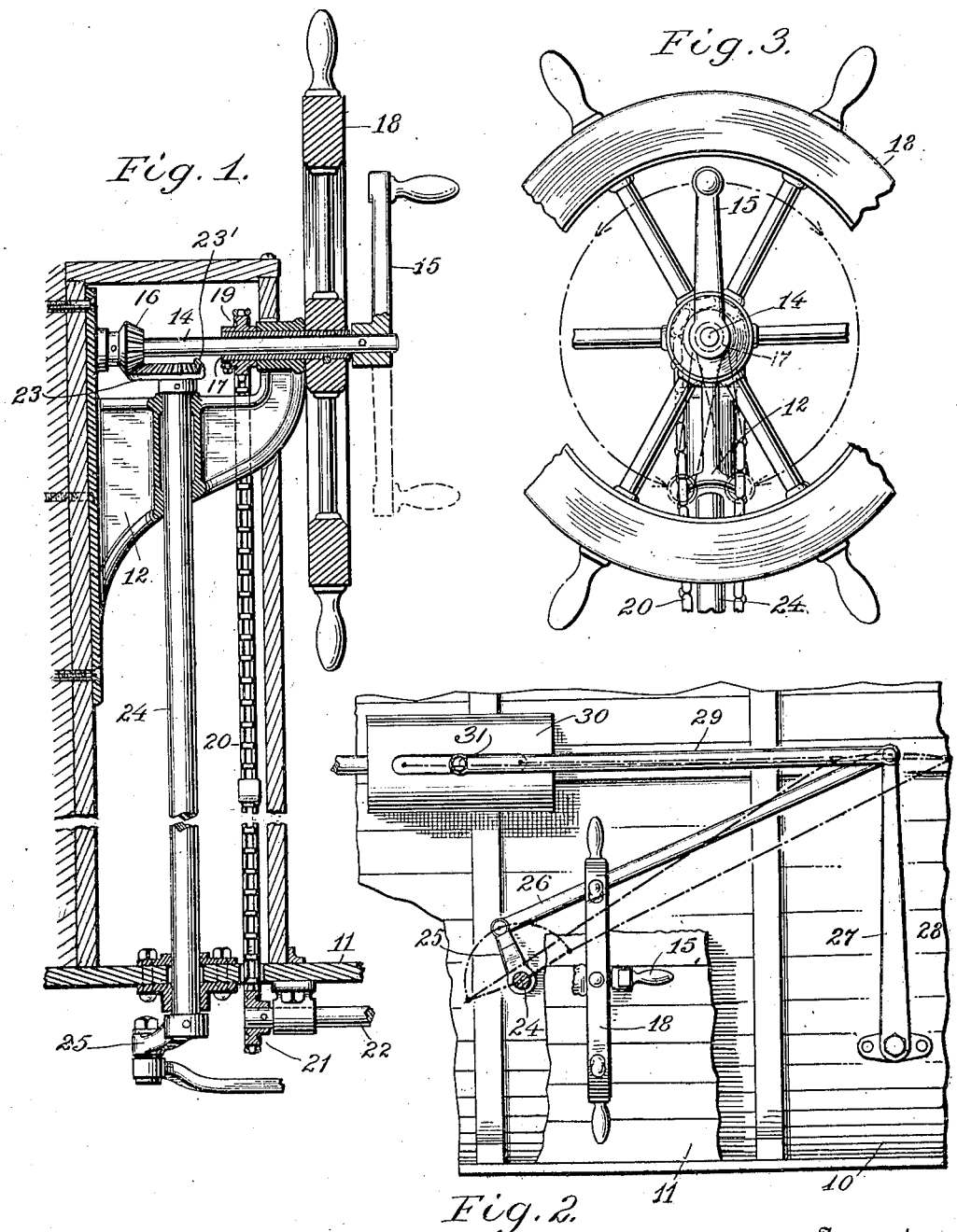

NATHANIEL ROE, OF PATCHOGUE, NEW YORK.

TRANSMISSION-CONTROLLING MECHANISM.

1,261,443.   Specification of Letters Patent.   Patented Apr. 2, 1918.

Application filed September 5, 1916. Serial No. 118,436.

*To all whom it may concern:*

Be it known that I, NATHANIEL ROE, a citizen of the United States, residing at Patchogue, Suffolk county, in the State of New York, have invented certain new and useful Improvements in Transmission-Controlling Mechanisms, of which the following is a full, clear, and exact specification.

This invention relates to improvements in transmission controlling mechanism, and more especially to mechanism of this character adapted for use in connection with motor-boats and the like, and has for its object to provide mechanism of this character which is positive and efficient in its operation.

Further, the invention has for its object to provide apparatus of this character by means of which the transmission mechanism may be actuated from a point distant therefrom.

Further, the invention has for its object to provide controlling mechanism comprising a shaft operatively connected to the transmission mechanism and means for actuating the said shaft.

Further, the invention has for its object to provide a transmission controlling mechanism comprising a hand actuated member positioned adjacent the steering wheel and operatively connected to the transmission mechanism whereby the latter may be readily and conveniently actuated by the person steering the boat.

Other objects will in part be obvious and in part be pointed out hereinafter.

To the attainment of the aforesaid objects and ends my invention consists in the novel details of construction, and in the combination, connection and arrangement of parts hereinafter more fully described and then pointed out in the claims.

In the accompanying drawings showing an illustrative embodiment of the invention—

Figure 1 is a view in side elevation showing my said transmission controlling mechanism associated with a steering mechanism, certain of the parts being shown in section;

Fig. 2 is a plan view, parts being broken away, and

Fig. 3 is a front view of the construction shown in Fig. 1.

Referring to the drawings 10 represents the body of a boat which is provided with a floor 11. Secured to a suitable support within the boat is a bracket 12 within which is journaled a shaft 14 forming part of the transmission controlling mechanism and carrying an operating handle 15 at one of its ends and a bevel gear 16 at the other of its ends. As shown the shaft 14 passes through a hollow shaft 17 rotatably supported upon the bracket 12, and having secured thereto the steering wheel 18 and a sprocket wheel 19. A sprocket chain 20 engages the sprocket wheel 19 and a sprocket wheel 21 located beneath the floor 11 of the boat, and secured to the shaft 22 forming part of the steering mechanism.

The bevel gear 16 on the shaft 14 meshes with a bevel gear 23 secured to the upper end of a vertical shaft 24. The bevel gear 23 is preferably in the form of a segment and is provided with stops 23' at its extremities to prevent the bevel gear 16 from being thrown out of engagement therewith. The lower end of the shaft 24 extends below the floor 11 and carries an arm 25 the free end of which is connected to one end of a link 26. The other end of the link 26 is pivotally connected to the free end of a radius arm 27 the other end of which is pivoted upon a support 28 secured to the body of the boat. A rod 29 has one of its ends pivotally connected to the free end of the arm 27, and its other end connected to the shifting rod 31 of transmission or gear shifting mechanism of any approved type which is positioned between the engine shaft and the propeller shaft in the usual manner and is inclosed within a casing 30.

In the embodiment of the invention shown the ratio between the bevel gears 16 and 23 is 1 to 2 whereby a half revolution of the shaft 14 will cause a quarter revolution of the shaft 24. It is, of course, understood that the ratio between these gears may be varied without departing from the spirit of the invention.

The operation of the controlling mechanism is as follows:—

When the parts are in their normal or neutral positions, as shown in full lines in the drawing, the engine shaft and the propeller shaft are disconnected from one another whereby, if the engine is running, there will be no movement of the boat. If it is desired to drive the boat ahead, the handle 15 is turned in a clockwise direction, as seen in Fig. 3, through an angle of about 180 degrees whereby the shaft 24 will be rotated in an anti-clockwise direction, as seen in Fig. 2, through an angle of about 90 degrees. This rotary movement of the shaft 24 will cause a forward movement of the arm 25, the link 26 and the radius arm 27, as indicated in dotted lines in Fig. 2, and the rod 29 will be caused to move in a forward direction. This movement of the rod 29 will actuate the shifting rod 31 of the transmission mechanism to connect the engine shaft with the propeller shaft in such a manner that the propeller shaft will be rotated in a direction to cause a forward movement of the boat.

If it is desired to cause the boat to move rearwardly from a position of rest, the handle 15 is moved in an anti-clockwise direction, as seen in Fig. 3, through an angle of about 180 degrees, thereby causing the parts of the mechanism to move in directions the reverse of those described above, as shown in dotted lines in Fig. 2. As a result the rod 29 will be moved rearwardly and the shifting rod 31 of the transmission mechanism will be actuated to connect the engine shaft to the propeller shaft in such a manner that the propeller shaft will be rotated in the opposite direction and the boat will move rearwardly.

Should the boat be running forward and it is desired to reverse the direction of rotation of the propeller it is merely necessary to rotate the handle 15 in an anti-clockwise direction, as seen in Fig. 3, through an angle of 360 degrees whereby the rod 29 will be moved from its extreme forward position to its extreme rearward position and the transmission mechanism will be actuated to change the driving connection between the engine and propeller shafts from a forward drive to a rearward drive.

In a similar manner, by turning the handle 15 in a clockwise direction, as seen in Fig. 3, through an angle of 360 degrees the motion of the boat may be changed from a rearward to a forward movement.

While the shaft 14 is shown as being mounted concentrically with the steering wheel shaft 17 in order to provide a convenient positioning of the handle 15 with respect to the steering wheel 18, it will, of course, be understood that the shaft 14 may be mounted independently of the steering shaft if desired.

Having thus described my said invention, what I claim and desire to secure by said Letters Patent is:

1. In an apparatus of the character described, the combination with a transmission mechanism comprising a shifting member, of a shaft, means to rotate said shaft, an arm secured to said shaft, a longitudinally movable rod having one of its ends operatively connected to said shifting member, and a link having one of its ends pivotally connected to said arm and having its other end pivotally connected to the other end of said longitudinally movable rod, substantially as specified.

2. In an apparatus of the character described, the combination with a transmission mechanism comprising a shifting member normally occupying a neutral or inoperative position and movable therefrom in either direction to occupy operative positions, of a shaft, means to rotate said shaft, an arm secured to said shaft, a longitudinally movable rod having one of its ends operatively connected to said shifting member, and a link having one of its ends pivotally connected to said arm and having its other end pivotally connected to the other end of said longitudinally movable rod, said link being substantially at a right angle to said arm when said shifting member is in its normal position, whereby as said shaft is rotated to move said shifting member into either of its operative positions said arm and said link will tend to move into parallelism with one another, substantially as specified.

3. In an apparatus of the character described, the combination with a transmission mechanism comprising a shifting member, of a shaft, means to rotate said shaft, an arm secured to said shaft, a support, a radius arm having one of its ends pivotally secured to said support, a longitudinally movable rod having one of its ends operatively connected to said shifting member, and a link having one of its ends pivotally connected to said arm, the other end of said link and the other end of said longitudinally movable rod being pivotally connected to the free end of said radius arm, substantially as specified.

Signed at the village of Patchogue, in the county of Suffolk and State of New York, this 21st day of August, one thousand nine hundred and sixteen.

NATHANIEL ROE.

Witnesses:
JOHN J. ROE,
FANNIE C. OVERTON.

Copies of this patent may be obtained for five cents each, by addressing the "Commissioner of Patents, Washington, D. C."